United States Patent Office 3,751,397
Patented Aug. 7, 1973

3,751,397
PROPYLENE POLYMER COMPOSITION
CONTAINING GLASS FIBERS
Kazuki Muto, Otake, Japan, assignor to Mitsui Petrochemical Industries, Ltd., Tokyo, Japan
No Drawing. Filed June 14, 1971, Ser. No. 153,122
Claims priority, application Japan, June 5, 1970,
45/48,064
Int. Cl. C08f 45/10
U.S. Cl. 260—41 AG   3 Claims

ABSTRACT OF THE DISCLOSURE

A glass fiber-reinforced propylene polymer composition comprising a modified propylene polymer having grafted thereto both styrene and maleic anhydride, and glass fibers treated with an aminotrialkoxy silane compound, and optionally an olefin polymer as a third component. The composition has high tensile modulus of elasticity and stress at bending yield point. Maleic anhydride can be grafted at a high ratio in the presence of styrene.

---

This invention relates to a reinforced propylene polymer composition including glass fibers.

Crystalline propylene polymers are very stable chemically because of freedom from any polar atomic grouping, but on the other hand, are inferior in chemical affinity with other substances. Attempts to improve the mechanical or thermal properties of the crystalline propylene polymer merely by incorporating a filler such as glass fibers produce but little effects, and the tensile strength and modulus of elasticity of the glass fiber-incorporated propylene polymer are only about twice those of a propylene polymer not containing the glass fiber, and the heat distortion temperature, too, rises only by 20 to 30° C.

It has previously been known that a reinforced polypropylene having superior mechanical and thermal properties is obtained by introducing a polar atomic grouping into polypropylene by some means, such as by chemically bonding the polar atomic grouping to a surface treating agent coated on glass fibers, and thereby chemically bonding the polypropylene to the glass fibers through the polar atomic grouping and the surface treating agent by merely incorporating glass fibers into unmodified polypropylene.

For example, U.S. Pat. 3,437,550 proposed a method of producing a laminated structure by the reaction of a cloth of glass fibers coated with gamma-aminopropyltriethoxy silane with polypropylene which has been modified with maleic anhydride.

The present invention is an improvement of the conventional process, and relates to a composition comprising a modified propylene polymer obtained by graft-copolymerizing styrene and maleic anhydride with a crystalline propylene polymer and glass fibers surface-treated with a silane compound containing an amino group, or a composition comprising such composition and a crystalline olefin polymer.

The present invention will be described in detail below.

The term "crystalline propylene polymer," used herein, includes a homopolymer of propylene, random copolymers of at least 90 mole percent of propylene units and not more htan 10 mole percent of another alpha-olefin or diolefin, and block copolymers of propylene consisting of at least 50 mole percent of propylene segments and not more than 50 mole percent of segments derived from another alpha-olefin or diolefin, all of which polymers have an isotactic index (I.I.) of at least 80 percent. The isotactic index or isotacticity (I.I.) is the weight percent of the insoluble portion of a given polymer when 100 parts of the polymer is dissolved in n-heptane at 100° C., and corresponds to the degree of crystallization of the polymer.

Examples of the preferred alpha-olefins and diolefins, one constituent of the random copolymers and block copolymers of propylene include alpha-olefins having 2 or 4–6 carbon atoms such as ethylene, 1-butene, 4-methylpentene-1, n-pentene-1, and n-hexane-1, and diolefins having 4 to 8 carbon atoms such as butadiene, isoprene, piperylene, hexadiene, and octadiene.

The propylene polymer as defined above should preferably have a molecular weight corresponding to an intrinsic viscosity $[\eta]$ of 0.5 to 5.0 which is calculated on the basis of the viscosity measured at 135° C. using Decalin as a solvent.

One constituent of the composition of the present invention consists of a propylene polymer obtained by graft-copolymerizing styrene and maleic anhydride with a propylene polymer as defined above.

The graft-copolymerization of styrene and maleic anhydride with a propylene polymer is performed, for example, by dissolving or suspending a propylene polymer (e.g., homopolymer of propylene) in an inert organic solvent such as toluene and xylene, and heating the solution or suspension in the presence of a radical initiator such as organic peroxides or azo compounds to a temperature above the decomposition temperature of the radical initiator, or by applying ionizing radiation thereto in place of, or in addition to, the radical initiator to generate radicals.

It has now been found that as compared with the graft-copolymerization of maleic anhydride alone with the propylene polymer, the graft-copolymerization of maleic anhydride with the propylene polymer in the presence of styrene can be performed under milder conditions, and that by so doing, the grafting ratio of maleic anhydride (the ratio of maleic anhydride in the reaction system which has been graft-copolymerized) can be increased.

Preferably, the amounts of styrene and maleic anhydride present in the propylene polymer to which styrene and maleic anhydride have been graft-copolymerized (modified propylene polymer) are in the range of 0.01 to 10% by weight respectively. The especially advantageous range is 0.03 to 5% by weight for each of the styrene and maleic anhydride. Frequently, good results are obtained with a maleic anhydride content of 0.02 to 0.1% by weight. If the amount of maleic anhydride becomes smaller than 0.02% by weight, especially smaller than 0.01% by weight, the amount of maleic anhydride chemically bonded to the glass fibers surface-treated with a silane compound containing an amino group becomes too small, and low reinforcing effects result.

The composition of the invention consists basically of a propylene polymer modified with styrene and maleic anhydride and glass fibers which have been surface-treated with an amino group-containing silane compound described below.

The silane compound containing an amino group is expressed by the following formula

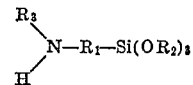

wherein $R_1$ is a divalent hydrocarbon radical having 2 to 4 carbon atoms, $R_2$ is an alkyl group having 1 to 4 carbon atoms, and $R_3$ is a hydrogen atom or an N-aminoalkyl group having 1 to 4 carbon atoms, and includes, for example, alpha-aminoethyl triethoxy silane, alpha-aminopropyltriethoxy silane, alpha-aminobutyltriethoxy silane, gamma-aminopropyltrimethoxy silane, gamma-aminopropyltriethoxy silane, N-(beta-aminoethyl)-gamma-aminopropyltrimethoxy silane.

The treatment of the surfaces of glass fibers with the trialkoxy silane containing an amino group is preferably performed by the following method, for example.

The trialkoxy silane containing an amino group is first dissolved in water to form a 0.05–5% by weight solution. Glass fibers are immersed in the resultant solution for several minutes to several hours, removed and then dried. The dried glass fibers are heat-treated usually at 100–200° C., preferably 110–150° C., for 5–20 minutes or more to thereby fix the amino group-containing trialkoxy silane on the surfaces of the glass fibers. The amount of the amino group-containing trialkoxy silane fixed at this time, although differing depending upon the diameter of the glass fibers, is generally within the range of 0.05 to 5.0% by weight based on the glass fibers.

The composition of the present invention is obtained by blending a modified propylene polymer to which styrene and maleic anhydride have been grafted with glass fibers surface-treated with a trialkoxy silane containing an amino group while maintaining at least the propylene polymer in the molten state. It is preferred that the blending be performed at 190 to 350° C., preferably 200 to 300° C., while keeping the modified propylene polymer in the molten state. Advantageously, the blending should be effected in a fabricating machine which effects such an operation as compression molding, injection molding, extrusion, or hollow molding.

It is preferred that the composition of the present invention should contain 5 to 60% by weight, especially 20 to 40% by weight, of glass fibers surface-treated with the amino group-containing silane compound.

When the heating temperature exceeds 300° C. (especially 350° C.) or the temperature of the mixture in the fabricating machine exceeds 300° C. (especially 350° C.) by kneading, the binder for the glass fibers discolors due to oxidation, and may result in the coloration of the composition or fabricated articles made from it. Furthermore, the molecules of the modified propylene polymer break, and the properties of the compositions or fabricated articles will deteriorate. Frequently, therefore, it is impossible to get good results.

The most typical method of producing the composition of the present invention, as previously stated, comprises blending the modified propylene polymer to which styrene and maleic anhydride have been grafted with glass fibers surface-treated with a trialkoxy silane compound containing an amino group while keeping the modified propylene polymer in the molten state. The composition can also be produced by the following method.

The propylene polymer, glass fibers surface treated with the trialkoxy silane containing an amino group, and styrene and maleic anhydride are mixed with one another at the specified proportions, and the mixture is heated to a temperature sufficient to maintain the propylene polymer in the molten state in the presence of a radical initiator and/or under the radiation of radioactive rays. This results in the formation of a modified propylene polymer to which styrene and maleic anhydride have been grafted, and at the same time, the formation of a composition substantially the same as the melt-blended product mentioned above.

The composition of the present invention may contain as a third component not more than 40 times, preferably not more than 10 times, the weight of the modified propylene polymer of an unmodified olefin polymer. Examples of this unmodified olefin polymer as a third component include homo- and copolymers of alpha-olefins having 2 to 6 carbon atoms, such as low density polyethylene, high density polyethylene, polypropylene, or poly-4-methyl-pentene. The incorporation of such olefin polymer can be performed while keeping the modified propylene polymer and the olefin polymer in the molten state. In this instance, also, the upper limit of the heating temperature should preferably be 300° C., especially 350° C.

The addition of the olefin polymer as a third component acts to dilute the styrene and maleic anhydride grafted to the propylene polymer in the composition of the invention and acts as a medium for intimate blending of the glass fibers and the unmodified olefin polymer. Thus, by the addition of the third component, desirable compositions are often obtained.

As previously stated, the composition of the present invention contains the modified propylene polymer to which styrene and maleic anhydride have been grafted, and the invention has the advantage that the modified propylene polymer to which maleic anhydride of a high content has been grafted at a high grafting ratio by grafting it in the presence of styrene can be used. Further advantage is the provision of a propylene polymer composition containing glass fibers which have superior mechanical properties such as stress at bending yield point, or flexural modules of elasticity to those of a composition of a propylene polymer to which only maleic anhydride has been grafted.

The invention will now be illustrated by the following examples which are not intended in any way to limit the scope of the invention.

REFERENTIAL EXAMPLE 1

Preparation of graft polypropylene

A 10-liter Henschel mixer was charged with 6 liters of xylene, 1,500 g. of polypropylene, 6 g. of benzoyl peroxide, 21 g. of styrene, and 20 g. of maleic anhydride, which were heated at 100 to 120° C. and stirred for 60 minutes by operating the mixer at a speed of 3,000 r.p.m. The polypropylene used had an intrinsic viscosity of 2.3 as measured with respect to a Decalin solution at 130° C., and an isotactic index (I.I), measured in n-heptane at 100° C., of 96%, and a melt index of 7.0.

After stirring for 30 minutes, a large quantity of methanol was added to stop the reaction, and the grafted polypropylene was precipitated. The precipitate was washed thoroughly with methanol, and grafted polypropylene was recovered.

Analysis of the grafted polypropylene by ultraviolet absorption spectroscopy indicated that a peak ascribable to styrene exists at 269 m., and its infrared absorption spectrum indicates that peaks exist at 1785 kayser and 1850 kayser. It was therefore confirmed that styrene and maleic anhydride were grafted to polypropylene. It was found that 0.3% by weight each of styrene and maleic anhydride had been grafted to polypropylene.

REFERENTIAL EXAMPLE 2

Pretreatment of glass fibers

Glass fibers each having a diameter of 10 microns and a length of 6 mm. were immersed for 0.5 minute in a 1% by weight aqueous solution of gamma-aminopropyl-trimethoxy silane, removed, and dried. The dried products were heat-treated at 100 to 120° C. for 10 minutes. The amount of the gamma-aminopropylmethoxy silane attached to the surface of the glass fibers was 0.1% by weight of the glass fibers.

EXAMPLE 1

The grafted polypropylene obtained in Referential Example 1 (1,400 g.) and 600 g. of the glass fibers treated in Referential Example 2 were placed in a tumbler blender, and reacted at 220° C. for 120 seconds with mixing. The product was withdrawn, and then injection molded at 240° C. to produce test pieces in accordance with ASTM. Various tests were performed using these test pieces in accordance with ASTM D–790 and D–648. The results are given in Table 1.

COMPARATIVE EXAMPLE 1

Maleic anhydride alone was graft-polymerized with polypropylene in the same way as set forth in Example 1 to produce grafted polypropylene having grafted thereto 0.5% by weight of maleic anhydride. The resultant grafted polypropylene was mixed with the glass fibers treated in Referential Example 2, and the mixture was molded and tested in the same way as set forth in Example 1. The results are also shown in Table 1.

TABLE 1

| | Test items | Example 1 | Comparative Ex. 1 |
|---|---|---|---|
| Graft polypropylene. | Maleic anhydride content (wt. percent). | 0.03 | 0.5 |
| | Styrene (wt. percent) | 0.03 | 0 |
| Reinforced polypropylene. | Tensile strength (kg./cm.$^2$) | 1,090 | 1,020 |
| | Tensile modules of elasticity elasticity (kg./cm.$^2$). | $5.7 \times 10^4$ | $5.4 \times 10^4$ |
| | Stress at bending yield point (kg./cm.$^2$). | 1,150 | 1,005 |
| | Flexural modules of elasticity (kg./cm.$^2$). | $6.4 \times 10^4$ | $5.7 \times 10^4$ |
| | Heat distortion temperature (18.6 kg./cm.$^2$.° C.). | 147 | 142 |

It is seen from the results obtained that the composition of the present invention has superior stress at bending yield point and flexural modules of elasticity to those of the composition of the comparative example.

EXAMPLE 2

By the same method as set forth in Referential Example 1, a grafted polypropylene having grafted thereto 1.4% by weight each of styrene and maleic anhydride was prepared.

Fifty-six grams of this grafted polypropylene were thoroughly mixed with 1,344 g. of unmodified polypropylene in a Henschel mixer to produce a polypropylene mixture containing 0.056% by weight each of styrene and maleic anhydride.

A tumbler blender was charged with 1,400 g. of the polypropylene mixture and 600 g. of the glass fibers treated in Referential Example 2, and they were mixed for 100 seconds at 230° C.

The reaction product was injection molded at 240° C., and test pieces were cut off. The various tests were conducted in the same way as set forth in Example 1. The results are given in Table 2.

COMPARATIVE EXAMPLE 2

Maleic anhydride alone was graft-copolymerized with polypropylene in the same way as set forth in Referential Example 1 to produce grafted polypropylene containing 1.4% by weight of maleic anhydride. Fifty-six grams of this graft polypropylene were mixed with 1,344 g. of unmodified polypropylene in a Henschel mixer to produce mixed polypropylene containing 0.056% by weight of maleic anhydride.

A tumbler blender was charged with 1,400 g. of the polypropylene mixture and the glass fibers treated in Referential Example 2, which were then mixed, fabricated, and tested in the same way as set forth in Example 1. The results obtained are given in Table 2.

TABLE 2

| | Test items | Example 1 | Comparative Ex. 2 |
|---|---|---|---|
| Graft polypropylene. | Maleic anhydride content (wt. percent). | 0.056 | 0.056 |
| | Styrene content (wt. percent) | 0.056 | 0 |
| Reinforced polypropylene. | Tensile strength (kg./cm.$^2$) | 1,105 | 1,065 |
| | Stress at bending yield point (kg./cm.$^2$). | 1,227 | 1,010 |
| | Flexural modules of elasticity (kg./cm.$^2$). | $6.7 \times 10^4$ | $5.4 \times 10^4$ |
| | Heat distortion temperature (18.6 kg./cm.$^2$.° C.). | 154 | 152 |

It is seen from the results shown in Table 2 that the composition of the present invention has substantially larger stress at bending yield point and flexural modules of elasticity than those of the composition obtained in Comparative Example 2.

EXAMPLE 3

A grafted ethylene-propylene copolymer was prepared under substantially the same conditions as set forth in Referential Example 1, using an ethylene-propylene copolymer instead of polypropylene. The ethylene-propylene copolymer was a random copolymer having an ethylene content of 10% by weight, an intrinsic viscosity measured in Decalin at 135° C. of 2.2, an I.I 96%, and a melt index of 7.0.

A tumbler blender was charged with 1,400 g. of the resultant grafted copolymer and 600 g. of the glass fibers treated in Referential Example 2, and the reaction was performed at 220° C. for 120 seconds. Various tests were made in the same way as set forth in Example 1. The results obtained are given in Table 3.

EXAMPLE 4

Grafting was performed under substantially the same conditions as set forth in Referential Example 1 using a propylene/butene-1 copolymer instead of polypropylene.

The propylene/butene-1 copolymer was a crystalline block copolymer having a butene-1 content of 10% by weight, an I.I. of 87, an intrinsic viscosity measured in Decalin at 135° C. of 2.3, and a melt index of 9.0.

A tumbler blender was charged with 1,400 g. of the grafted copolymer and 600 g. of the glass fibers treated in Referential Example 2, and the reaction was performed at 220° C. for 110 seconds. The physical properties of the resultant composition were tested in the same way as set forth in Example 1. The results are shown in Table 3.

EXAMPLE 5

Glass fibers were treated in the same way as set forth in Referential Example 2 except that alpha-aminobutyltriethoxy silane was used instead of the gamma-aminopropyltrimethoxy silane.

A tumbler blender was charged with 600 g. of the glass fibers so treated and 1,400 g. of the same graft polypropylene as prepared in Referential Example 1, and the reaction was performed at 200° C. for 160 seconds.

The physical properties of the resultant composition were tested in the same way as set forth in Example 1. The results are shown in Table 3.

EXAMPLE 6

Glass fibers were treated in the same way as set forth in Referential Example 2 except that alpha-aminobutyltriethoxy silane was used instead of the gamma-aminopropyltrimethoxy silane.

A tumbler blender was charged with 600 g. of the glass fibers so treated an 1,400 g. of the same grafted polypropylene as prepared in Referential Example 1, and the reaction was performed at 240° C. for 100 seconds.

The physical properties of the resultant composition were tested in the same way as set forth in Example 1. The results obtained are given in Table 3.

EXAMPLE 7

Glass fibers were treated in the same way as set forth in Referential Example 2 except that N-beta-aminoethyl)-gamma-aminopropyltrimethoxy silane was used instead of the gamma-aminopropyltrimethoxy silane.

After that, the same procedure as set forth in Example 6 was repeated. The results are given in Table 3.

TABLE 3

| Test items | Ex. 3 | Ex. 4 | Ex. 5 | Ex. 6 | Ex. 7 |
|---|---|---|---|---|---|
| Tensile strength (kg./cm.$^2$) | 860 | 900 | 1,080 | 1,060 | 1,050 |
| Tensile elasticity of module (kg./cm.$^2$) | $4.3 \times 10^4$ | $5.5 \times 10^4$ | $5.7 \times 10^4$ | $5.6 \times 10^4$ | $5.7 \times 10^4$ |
| Stress at bending yield point (kg./cm.$^2$) | 950 | 980 | 1,100 | 1,130 | 1,150 |
| Flexural elasticity of modules (kg./cm.$^2$) | $4.5 \times 10^4$ | $4.7 \times 10^4$ | $6.4 \times 10^4$ | $6.2 \times 10^4$ | $6.3 \times 10^4$ |
| Heat distortion temperature (186 kg./cm.$^2$.° C.) | 140 | 142 | 147 | 145 | 145 |

EXAMPLE 8

To 1,400 g. of polypropylene powders used in Referential Example 1, 3 g. of maleic anhydride, 6 g. of styrene and 3 g. of dicumyl peroxide were added. They were thoroughly mixed with one another in a Henschel mixer cooled so as not to raise the temperature above 50° C. To the mixture 600 g. of glass fibers (diameter 13 microns, and length 6 mm.) treated in the same way as set forth in Referential Example 2 were added. The reaction was performed in a tumbler blender at 230° C. for 120 seconds.

The physical properties of the resultant composition were tested in the same way as set forth in Example 1. The results obtained are shown in Table 4.

COMPARATIVE EXAMPLE 3

The procedure of Example 8 was repeated without using styrene. The physical properties of the resultant composition were tested in the same way as set forth in Example 1. The results obtained are shown in Table 4.

TABLE 4

| Test items | Example 8 | Comparative Ex. 3 |
|---|---|---|
| Tensile strength (kg./cm.$^2$) | 1,120 | 1,068 |
| Tensile modules of elasticity (kg./cm.$^2$) | $6.45 \times 10^4$ | $6.43 \times 10^4$ |
| Stress at bending yield point (kg./cm.$^2$) | 1,102 | 1,024 |
| Flexural modules of elasticity (kg./cm.$^2$) | 55.0 | 50.0 |
| Heat distortion temperature (18.6 kg./cm.$^2$. ° C.) | 154 | 150 |

What is claimed is:

1. A propylene polymer composition containing glass fibers, which comprises:
   (A) a modified propylene polymer in which 0.01 to 10% by weight of styrene and 0.01 to 10% by weight of maleic anhydride are grafted to (A') a propylene polymer having an isotactic index of at least 80, said propylene polymer being selected from the group consisting of (a) a homopolymer of propylene, (b) random copolymers composed of not more than 10 mole percent of alpha-olefins having 2 or 4 to 6 carbon atoms and diolefins having 4 to 8 carbon atoms with the remainder being propylene, and (c) block copolymers composed of at least 50 mole percent of propylene segments and not more than 50 mole percent of at least one of said alpha-olefins and diolefins; and
   (B) glass fibers having a coating of at least one compound of the formula

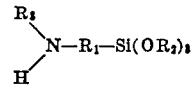

wherein $R_1$ is a divalent hydrocarbon radical having 2 to 4 carbon atoms, $R_2$ is an alkyl group having 1 to 4 carbon atoms, and $R_3$ is a hydrogen atom or an N-aminoalkyl group having 1 to 4 carbon atoms, at a rate of 0.05 to 5% by weight, said glass fibers (B) being blended with said modified propylene polymer (A) while said modified propylene polymer (A) is in the molten state.

2. The propylene polymer composition of claim 1 wherein said glass fibers (B) are blended with said modified propylene polymer (A) in the presence of additional propylene polymer (A') while the modified propylene polymer (A) and the propylene polymer (A') are in the molten state.

3. The propylene polymer composition of claim 1 wherein said glass fibers (B) are blended with said propylene polymer (A'), maleic anhydride and styrene in the presence of a radical initiator or under the irradiation of radioactive rays, while said propylene polymer (A') is in the molten state.

References Cited

UNITED STATES PATENTS

| | | | |
|---|---|---|---|
| 3,437,550 | 4/1969 | Paul | 260—41 AG |
| 3,579,476 | 5/1971 | Rieke et al. | 260—41 AG |
| 3,236,917 | 2/1966 | Natta et al. | 260—878 |

OTHER REFERENCES

Schildknecht, Calvin E.: "Vinyl and Related Polymers," John Wiley & Sons, New York, 1952, p. 706.

MORRIS LIEBMAN, Primary Examiner

J. H. DERRINGTON, Assistant Examiner

U.S. Cl. X.R.

204—159.17; 260—878 R